United States Patent [19]

Zarchy et al.

[11] Patent Number: 5,453,113
[45] Date of Patent: Sep. 26, 1995

[54] PROCESS FOR SEPARATION AND RECOVERY OF METHYL CHLORIDE FROM VENT STREAMS CONTAINING ISOBUTANE

[75] Inventors: Andrew S. Zarchy, Amawalk; Richard T. Maurer, Nanuet; Chin C. Chao, Millwood, all of N.Y.

[73] Assignee: UOP, Des Plaines, Ill.

[21] Appl. No.: 225,861

[22] Filed: Apr. 11, 1994

[51] Int. Cl.$^6$ .................................................. B01D 53/047
[52] U.S. Cl. .................................. 95/41; 95/101; 95/102; 95/105; 95/132; 95/142
[58] Field of Search ......................... 95/96–105, 132, 95/142, 39, 41

[56] References Cited

U.S. PATENT DOCUMENTS

| | | | |
|---|---|---|---|
| 3,430,418 | 3/1969 | Wagner | 55/25 |
| 3,494,102 | 2/1970 | Dunn, Jr. | 95/142 |
| 3,986,849 | 10/1976 | Fuderer et al. | 55/25 |
| 4,020,117 | 4/1977 | Sisson | 95/142 X |
| 4,056,369 | 11/1977 | Quackenbush | 95/142 X |
| 4,310,440 | 1/1982 | Wilson et al. | 252/435 |
| 4,440,871 | 4/1984 | Lok et al. | 502/214 |
| 4,567,027 | 1/1986 | Detournay et al. | 423/101 |
| 4,713,413 | 12/1987 | Tegge et al. | 525/54 |
| 5,051,117 | 9/1991 | Prigge et al. | 95/142 X |
| 5,248,395 | 9/1993 | Rastelli et al. | 95/142 X |
| 5,264,084 | 11/1993 | Schinabeck et al. | 203/34 |
| 5,296,017 | 3/1994 | Kono et al. | 95/132 X |
| 5,302,187 | 4/1994 | Itoh et al. | 95/132 X |
| 5,330,561 | 7/1994 | Kumar et al. | 95/105 X |
| 5,346,535 | 9/1994 | Kuznicki et al. | 95/142 X |

FOREIGN PATENT DOCUMENTS

| | | | |
|---|---|---|---|
| 0354259 | 2/1990 | European Pat. Off. | 95/103 |
| 3303423 | 8/1984 | Germany | 95/142 |
| 55-129132 | 10/1980 | Japan | 95/142 |
| 3-205305 | 9/1991 | Japan | 95/103 |

OTHER PUBLICATIONS

Leverkusen et al. eds. *Silicones Chemistry and Technology* CRC Press, 1991, pp. 1–11.

Noll, Walter, *Chemistry and Technology of Silicones*, New York, Academic Press, 1968, Section 2.2.

Ullman's Encyclopedia of Industrial Chemistry, VCH Publishers, 1993, vol. A24, pp. 24–26.

*Primary Examiner*—Robert Spitzer
*Attorney, Agent, or Firm*—Thomas K. McBride; John G. Tolomei; Richard P. Silverman

[57] ABSTRACT

The present invention provides a process for the recovery of methyl chloride from a mixture thereof with isobutane. The process employs pressure swing adsorption with a size selective adsorbent having a pore opening of between about 3.7×3.7 Angstroms and about 4.9×5.7 Angstroms, such as zeolite A, clinoptilolite and mixtures thereof to selectively adsorb methyl chloride from vent streams comprising methyl chloride and isobutane and recovering a tail gas stream enriched in methyl chloride. The process may be used in applications such as treating the vent gas streams from the direct synthesis of methyl chlorosilanes. The process provides an economical route to recovering a valuable raw material in the process of making silicones and reduces the volume and methyl chloride content of the vent stream which is typically incinerated to avoid the release of halogenated hydrocarbons to the atmosphere.

24 Claims, 2 Drawing Sheets

PROCESS FOR SEPARATION AND RECOVERY OF METHYL CHLORIDE FROM VENT STREAMS CONTAINING ISOBUTANE

FIELD OF THE INVENTION

This invention relates to a pressure swing adsorption process for the recovery of methyl chloride from a mixture thereof with isobutane. The invention relates to size selective separation of methyl chloride from a gas stream containing a mixture of isobutane and methyl chloride using pressure swing adsorption which avoids conventional fractionation schemes involving the separation of methyl chloride from azeotropic mixtures with isobutane.

BACKGROUND OF THE INVENTION

The term "silicones" covers a broad spectrum of low viscosity liquids, oils and greases, rubbers and resins. Commercially produced silicones have become widely used in industrial sectors ranging from the pharmaceutical and cosmetic industries to the metal manufacturing industry and the electrical industry. Their broad range of commercial application stems from the different characteristics of a large number of different chemical building blocks. These chemical building blocks are known as chlorosilanes. The most significant production route to the production of silicones is the direct synthesis of methyl chlorosilanes. The direct synthesis is described in *Silicones-Chemistry and Technology*, CRC Press, 1991, pages 1–11 and in U.S. Pat. No. 5,264,084.

The direct synthesis of methyl chlorosilanes from silicon and methyl chloride at 250° to 300° C. by means of copper catalysts produces, in addition to the methyl-chlorosilanes of the general formula $Me_xSiCl_{4-x}$, x having values of from 0 to 4 and Me represents a methyl group, also ethylchlorosilanes, various silanes, in particular $Me_yHSiCl_{3-y}$, wherein y has values of from 0 to 2, and ethyldichlorosilane ($EtHSiCl_2$) in small amounts. Furthermore, various straight-chain and branched alkanes and alkenes having up to 9 carbon atoms are also formed as impurities. Typical reaction conditions and process fundamentals are discussed in *Chemistry and Technology of Silicones*, by Walter Noll, Academic Press, 1968. Section 2.2 and in *Ullmann's Encyclopedia Of Industrial Chemistry*, VCH Publishers, 1993, Vol. A24, pages 24–26. The above cited references are herein incorporated by reference.

The methyl chlorosilanes are separated by distillation and freed from impurities. However, some alkenes and alkanes cannot be completely removed in this manner due to their boiling point or because of the formation of azeotropic mixtures.

Adsorption processes are well known for separating and purifying less readily adsorbable components from feedstreams containing mixtures thereof with more readily adsorbable components.

Pressure swing adsorption processes generally involve passage of the feedstream through two or more adsorber beds containing molecular sieves or other adsorbents which selectively adsorb the more readily adsorbable components of the feedstream. The adsorbers are arranged to operate in sequence with suitable lines, valves, timers and the like so there is established an adsorption period during which the more readily adsorbable components of the feed stream are adsorbed on the molecular sieve or other adsorbent and a regeneration period during which the more readily adsorbable components are desorbed and purged from the adsorbent to regenerate it for reuse.

Such selective adsorption commonly occurs in the adsorber beds at an upper adsorption pressure, with the more readily adsorbable component thereafter being desorbed by pressure reduction to a lower desorption pressure. Such PSA processing is disclosed in U.S. Pat. No. 3,430,418 to Wagner and in U.S. Pat. No. 3,986,849 to Fuderer et al, wherein cycles based on the use of multi-bed systems are described in detail and are herein incorporated by reference. As is generally known and described in these patents, the contents of which are incorporated herein by reference as if set out in full, the PSA process is generally carried out in a sequential process cycle that includes each bed of the PSA system. In addition to the adsorption step, such cycles commonly include steps involving the release of void space gas from the product end of each bed in one or more cocurrent depressurization steps upon completion of the adsorption step. In these cycles, the released gas typically is employed for pressure equalization and for subsequent purge steps. The bed is thereafter countercurrently depressurized and often purged to desorb the more selectively adsorbed component of the feedstream from the adsorbent and to remove such gas from the feed end of the bed prior to the repressurization thereof to the adsorption pressure.

In the production of methyl chlorosilanes it is important to recover a significant portion of the methyl chloride from the direct synthesis product to minimize the loss of this valuable reactant and to control the release of this halocarbon to the atmosphere. Currently, methyl chloride is fractionated from the liquid portion of the direct synthesis product and absorbed and stripped from the vapor portion of the direct synthesis product. However, in the process of these fractionation steps, methyl chloride forms an azeotropic mixture with lower alkanes, particularly branched alkanes, such as isobutane, making further fractionation difficult and economically unattractive. Typically, this mixture is expelled from the process as a vent stream comprising gases such as methane, hydrogen, methyl chloride and nitrogen as well as residual amounts of alkanes. Because the vent stream may contain chlorinated compounds, it typically is incinerated. It is known to employ a pressure swing adsorption process with a silica gel or activated carbon adsorbent to concentrate the chlorinated hydrocarbons in the vent stream from a methyl chlorosilane reaction zone prior to incineration to remove gases which can be vented to the atmosphere or used as fuel. The concentrated chlorinated hydrocarbons such as methyl chloride and other residual materials can be subsequently incinerated. In this way the processing load on the incineration operation is reduced. Such processes do not address the recovery of methyl chloride for use by the methyl chlorosilane process. Others have employed such adsorbents as carbon for the adsorption of hydrocarbons and chlorinated hydrocarbons from a solvent mixture in air and subsequently desorbed the chlorinated hydrocarbon by heat desorption, as exemplified in U.S. Pat. No. 4,056,369. U.S. Pat. No. 4,713,413 discloses a process employing activated alumina to recover organic halides from a hydrocarbon solvent. Processes are sought which result in the economic recovery of the methyl chloride from these vent streams without the loss of methyl chloride or without the escape of the methyl chloride to the atmosphere.

SUMMARY OF THE INVENTION

The present invention provides an improved pressure swing adsorption process for the recovery of methyl chloride from mixtures with isobutane, nitrogen, and $C_1$ to $C_5$ alkanes. Using selective adsorbents which are size selective, methyl chloride can be selectively adsorbed from mixtures containing isobutane and recovered at high purity for return to a reactor for the direct synthesis of methyl chlorosilanes, or optionally with the addition of an external copurge step employing a stream comprising methane, the alkanes can be rejected.

In one embodiment, the invention is a process for the recovery of high purity methyl chloride from a gas stream, comprising methyl chloride and isobutane. The process comprises passing the vent gas stream at adsorption conditions including an adsorption temperature and an adsorption pressure to a pressure swing adsorption zone. The pressure swing adsorption zone comprises an adsorption bed containing a size selective adsorbent which is selective for the adsorption of methyl chloride to provide a waste gas stream comprising isobutane. The waste gas stream is withdrawn at a pressure substantially equal to the adsorption pressure. A tail gas stream comprising high purity methyl chloride is withdrawn at a desorption In a further aspect, the invention is a pressure swing adsorption process for the separation of methyl chloride from a feed mixture including methyl chloride and isobutane. The process comprises the following steps. The feed mixture is passed to an adsorption zone which comprises a first adsorption bed of at least two adsorption beds. The adsorption beds contain at least one solid adsorbent having a pore size of about 5 Angstroms and selective for the adsorption of methyl chloride. The first adsorption zone is at a first adsorption pressure and a first adsorption temperature. A first product stream comprising isobutane is recovered from the fast adsorption zone. The first adsorption bed is cocurrently displaced with a displacement gas and a second product stream comprising isobutane is recovered. The first adsorption bed is cocurrently depressurized to an equalization pressure to provide an equalization gas. The first adsorption bed is countercurrently depressurized to a desorption pressure that is at or below atmospheric pressure and a desorption effluent stream comprising high purity methyl chloride is recovered. The first adsorption zone is countercurrently purged with a purge gas from another adsorption bed and a purge effluent stream comprising high purity methyl chloride is recovered.

In a still further aspect of the invention, the invention is a process for the recovery of methyl chloride from a vent gas of a direct synthesis methyl chlorosilane plant. The vent gas comprising methyl chloride and isobutane is passed to a pressure swing adsorption zone comprising a first adsorption bed of at least two adsorption beds. The adsorption beds contain at least one solid adsorbent having a pore size of about 5 Angstroms and selective for the adsorption of methyl chloride. The first adsorption zone is at a first adsorption pressure and a first adsorption temperature. A first product stream comprising isobutane is recovered therefrom. The first adsorption zone is cocurrently displaced with a displacement gas and a second product stream comprising isobutane is recovered. The first adsorption bed is cocurrently depressurized to an equalization pressure to provide an equalization gas. The first adsorption zone is countercurrently depressurized to a desorption pressure that is at or below atmospheric pressure and a desorption effluent stream comprising methyl chloride is recovered. The first adsorption bed is countercurrently purged with a purge gas from another adsorption bed and purge effluent stream comprising methyl chloride is recovered. The first adsorption zone is repressurized. The desorption effluent stream and the purge effluent stream are combined to provide a combined methyl chloride stream. The combined methyl chloride stream is compressed and cooled to provide a purified methyl chloride stream and a vapor stream comprising non-condensibles. At least a potion of the high purity methyl chloride stream is returned to the direct synthesis methyl chlorosilane plant.

Other aspects of the invention include the use of a 5A zeolite molecular sieve or an acid washed clinoptilolite as a selective adsorbent for the adsorption of methyl chloride. Further aspects include the use of a fuel stream comprising methane as a copurge stream to withdraw the isobutane containing product at a heating value consistent with a fuel stream. In a still further aspect of the invention, fresh methyl chloride is employed as a copurge of the adsorption bed prior to its use as a reactor feed to insure the withdrawal of high purity methyl chloride in the desorption and purge effluent streams.

DETAILED DESCRIPTION OF THE INVENTION

Figure 1:
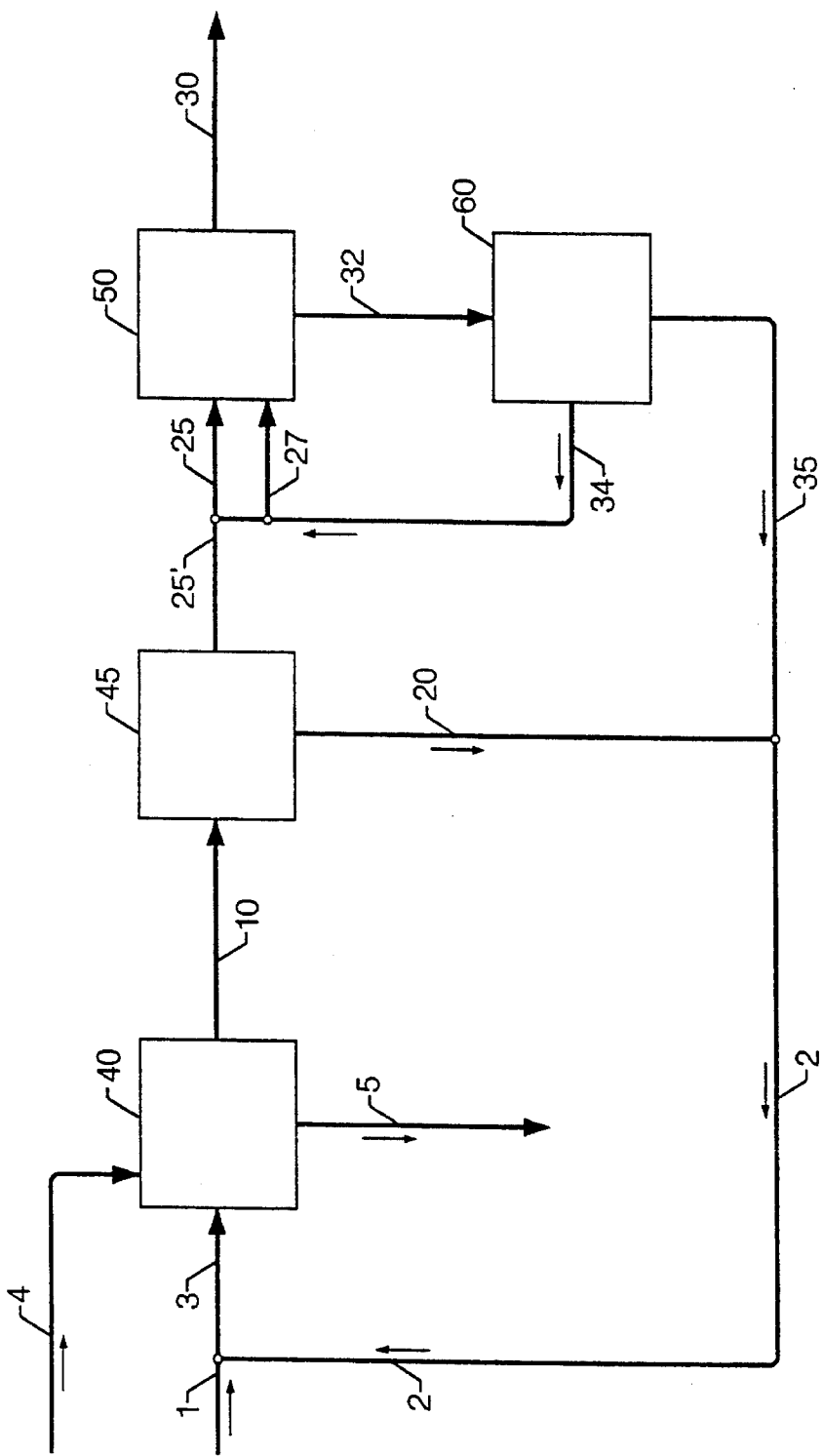
FIG. 1 is a schematic process of flow diagram for the direct synthesis of methyl chlorosilane from silicon and methyl chloride employing the separation step of the instant invention.

The process of the invention relates to conventional PSA processing in which each bed of an adsorption zone undergoes, on a cyclic basis, high pressure adsorption, optional cocurrent depressurization to intermediate pressure level(s) with release of void space gas from the product end of the bed, countercurrent depressurization to lower desorption pressure with the release of desorbed gas from the feed end of the bed, with or without purge of the bed, and repressurization to higher adsorption pressure. The process of the present invention adds to this basic cycle sequence a cocurrent displacement step in the adsorption zone in which the less readily adsorbable component is essentially completely removed therefrom. The adsorption zone is then countercurrently depressurized to a desorption pressure that is at or below atmospheric pressure with the adsorbable component being discharged from the feed end thereof as a product of desired purity. In the multi-bed adsorption systems to which the invention is directed, the displacement gas used for each bed is advantageously obtained by the use of pure methyl chloride as a portion of the methyl chloride feed to the direct synthesis of methyl chlorosilanes, or by the use of a methane-containing stream.

Those skilled in the art will appreciate that the high pressure adsorption step of the PSA process comprises introducing the feedstream to the feed end of the adsorbent bed at a high adsorption pressure. The less readily adsorbable component passes through the bed and is discharged from the product end thereof. An adsorption front is established in the bed with the front likewise moving cocurrently through the bed from the feed end toward the product end thereof. Thus, the term cocurrent refers to the direction of the flow of material in the same direction as the flow of the feedstream. The term countercurrent refers to the flow direction opposite to that of the feedstream.

It will also be understood that the invention can be carried out using any suitable adsorbent material in the first and second adsorption zones having a selectivity for various components of a feedstream over other such components, thereby providing a less readily adsorbable component and a more readily adsorbable component. Suitable adsorbents known in the art and commercially available include crystalline molecular sieves. The molecular sieves include, for example, the various forms of silicoaluminophosphates, and aluminophosphates disclosed in U.S. Pat. Nos. 4,440,871; 4,310,440 and 4,567,027, hereby incorporated by reference as well as zeolitic molecular sieves.

Zeolitic molecular sieves in the calcined form may be represented by the general formula:

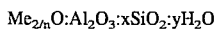

where Me is a cation, x has a value from about 2 to infinity, n is the cation valence and y has a value of from about 2 to 10.

The size selective separation of the instant invention without being bound by any particular theory is believed to be accomplished by employing adsorbent materials which have a sufficiently large pore opening to permit the passage of the methyl chloride molecule while being small enough to exclude the isobutane molecule. The molecular dimensions of methyl chloride are approximately 3.7×3.7×4.6 Angstroms and the molecular dimensions of isobutane are approximately 4.9×5.7×6.2 Angstroms. Therefore, it is preferred that adsorbents having with a pore size with a pore opening ranging from about 3.7×3.7 Angstroms to about 4.9×5.7 Angstroms theoretically could adsorb methyl chloride and exclude isobutane. Typical adsorbents having a structure with a pore size within this range may be selected from the group consisting of ALPO-31, ALPO-11, ALPO-14, ALPO-17, ALPO-41, EU-1, Ferrierite, Clinoptilolite, ZSM-11, ZSM-57, ZSM-23, Them-1, Chiavennite, ALPO-18, MAPO-39, ALPO-12, AlPO-22, Chabazite, Deca-dodecasil 3R, TMA-E, Erionite, ZK-5, Levynite, Zeolite A, Zeolite Rho, and mixtures thereof. Furthermore, the pore size of adsorbents may be influenced by ion-exchanging the adsorbent with a cation. For example, such ion-exchanged adsorbents as Zeolite A exchanged with sodium, magnesium, calcium, strontium, zinc, and manganese will have an acceptable pore size for this separation, while zeolite A, which is ion-exchanged with potassium and barium will not be useful. In a similar manner, clinoptilolites which have been exchanged with ammonium, potassium, barium, zinc, and proton exchanged (acid washed) are preferred, while clinoptilolites having been ion-exchanged with cations such as sodium, calcium, and magnesium, and mixtures thereof would not be useful in this separation. To some extent, the size of the pore opening will vary somewhat with temperature, such that at a higher temperature, the pore opening will be slightly larger than at a lower temperature.

A second factor influencing the selection of a size selective adsorbent for the process of the instant invention is the adsorption strength for the adsorbed species. For example, methyl chloride, which has a boiling point at atmospheric pressure of −23.7° C. has a large dipole moment (1.89 debye) which may result in strong interaction with cations in the adsorbent structure. In order for the pressure swing adsorption process to operate economically with a minimum amount of adsorbent and equipment, the adsorbent will preferably have a linear adsorption isotherm with respect to the partial pressure of methyl chloride. The size selective adsorbent should have a minimum of cations in the crystalline structure of the adsorbent, or the cations should be unreachable by the adsorbed component, or the cations should have a weak electrostatic field to minimize the interaction with the methyl chloride molecule. Therefore, the preferred adsorbent will be a zeolite with a high silica to alumina ratio. For zeolites with similar structures but with different cations, the preferred zeolite will have weak cations such as zinc or hydrogen rather than strong cations such as calcium. For zeolites with different structure, in general zeolites with higher silica to alumina ratios are preferred. With respect to microporous materials, those materials without cations are preferred over those with cations. For example, a microporous molecular sieve such as AlPO is preferred over a zeolite with the same structure. A zeolite such as zinc zeolite A with a silica to alumina ratio of 2.3 would be expected to perform better than a calcium zeolite A with a silica alumina ratio of 2.0, and similarly an acid washed (acid leached) clinoptilolite or an ammonium exchanged and calcined clinoptilolite would be preferred over a potassium exchanged clinoptilolite. Ammonium exchanging and calcining to remove the ammonium ion results in a decationized clinoptilolite.

A third factor affecting the selection of the size selective adsorbent for the process of the instant invention is acid stability, for there is a possibility that HCl will be generated during the separation process. Size selective adsorbents are preferred with higher silica to alumina ratios to minimize the reaction of the aluminum ions in the adsorbent structure with the HCl. In general, any zeolite with a silica to alumina ratio greater than about 5 may be considered substantially acid stable. Those zeolites having a silica to alumina ratio greater than 8 are considered very acid stable. For example, a zeolite A having a silica to alumina ratio of greater than 2.3 is preferred over a typical zeolite A having a silica to alumina ratio of 2.0. Typically clinoptilolite has a silica alumina ratio of between about 8 and about 9. With acid leaching, the silica to alumina ratio of the clinoptilolite can be increased to a value of about 14 to about 20. Clinoptilolite with a silica alumina ratio in excess of 9 is preferred over the zeolite A. The practical choice of the material employed as the size selective adsorbent for use in the process of the instant invention will be based on availability, acid stability, methyl chloride isotherm shape, adsorbent capacity and other cost considerations. Detailed descriptions of some of the above identified zeolites may be found in D. W. Breck, ZEOLITE MOLECULAR SIEVES, by John Wiley and Sons, New York, 1974, hereby incorporated by reference. More preferably, the size selective adsorbent is selected from the group consisting of Zeolite 5A, Zeolite 4A, clinoptilolite, and mixtures thereof. Most preferably, the size selective adsorbent is selected from the group consisting of Zeolite 5A, Zeolite 4A, acid leached clinoptilolite, decationized clinoptilolite, and mixtures thereof.

It is often desirable when using crystalline molecular sieves that the molecular sieve be agglomerated with a binder in order to ensure that the adsorbent will have suitable physical properties. Although there are a variety of synthetic and naturally occurring binder materials available such as metal oxides, clays, silicas, aluminas, silica-aluminas, silica-zirconias, silica-thorias, silica-berylias, silica-titanias, silica-alumina-thorias, silica-alumina-zirconias, mixtures of these and the like, clay-type binders are preferred. Examples of clays which may be employed to agglomerate the molecular sieve without substantially altering the adsorptive properties of the zeolite are attapulgite, kaolin, volclay, sepiolite, palygorskite, kaolinite, bentonite, montmorillonite, illite and chlorite. The choice of a suitable binder and methods employed to agglomerate the molecular sieves are generally known to those skilled in the art and need not be further described herein.

The further description of the process of this invention is presented with reference to the attached schematic, FIG. 1. This figure represents a preferred arrangement of the invention and is not intended to be a limit on the generally broad scope of the invention as set forth in the claims. Only those elements and lines necessary for a complete understanding of the process are illustrated.

Referring to FIG. 1, a high purity methyl chloride stream 5 containing at least 98% methyl chloride, and preferably at least 99% methyl chloride is passed via lines 1 and 3 to a reaction zone 40 for the direct synthesis of methyl chlorosilanes. Silicon of chemical quality, typically obtained by electro-thermal reduction of silicon dioxide with carbon and having a purity of at least 99%, is passed to the reaction zone 40 via line 4. The direct synthesis reaction is normally carried out in a fluidized bed as a gas-solid reaction. The silicon is typically crushed and ground into a fine powder having particle sizes in the range of 30–350 μm. The direct synthesis of the silicon with the gaseous methyl chloride is exothermic and produces about 725 kcal (about 3,000 kJ) per kg of silane mixture produced. The crude silane mixture is withdrawn in line 5 for recovery and purification of individual methyl chlorosilanes. A vapor reactor effluent stream comprising methyl chloride, nitrogen and $C_1$–$C_5$ hydrocarbons is withdrawn via line 10 to a purification zone 45 for the recovery of methyl chloride to provide a methyl chloride recycle stream 20 which is returned via line 2 to be admixed with the feed methyl chloride in line 1. The purification zone for the recovery of methyl chloride also produces a vent stream comprising methyl chloride, nitrogen, and $C_1$–$C_5$ hydrocarbons including isobutane which are withdrawn in line 25' and passed in line 25 to a pressure swing adsorption zone 50. The pressure swing adsorption zone 50 preferably contains at least 2 adsorption beds, and more preferably contains at least 3 adsorption beds. The adsorption conditions include an adsorption temperature preferably ranging from about 20° C. to about 120° C. and an adsorption pressure, preferably ranging from about 100 kPa (14.7 psia) to about 1.7 MPa (250 psia). Each adsorption bed contains a size selective adsorbent for the selective adsorption of methyl chloride over isobutane. Preferably the size selective adsorbent is selected from the group consisting of zeolite 5A and acid leached clinoptilolite and mixtures thereof. A first adsorber effluent product stream 30 comprising $C_1$–$C_5$ hydrocarbons and preferably enriched in isobutane relative to the vent stream is withdrawn from adsorber 50 during an adsorption step. The first adsorber effluent product stream is typically passed to an incinerator for disposal. This adsorber effluent product stream will preferably contain less than about 10 wt-% chlorinated hydrocarbons including methyl chloride. In order to increase the recovery of a high purity methyl chloride stream, an external copurge step, or cocurrent displacement step with a stream such as a portion of the high purity methyl chloride stream in the methyl chloride stream 1, (not shown) is employed to rinse the adsorption bed prior to any depressurization steps and a second adsorber effluent stream comprising isobutane is withdrawn and combined with the first effluent product stream. Following the copurge step, the adsorption bed is depressurized and purged to provide a high purity methyl chloride desorption effluent stream in line 32, preferably at a desorption pressure at or below atmospheric pressure and more preferably at a desorption pressure ranging from about 0.7 kPa (0.1 psia) to about 100 kPa (14 psia). Preferably the adsorption bed is purged with at least a portion of the product gas 30 withdrawn during the cocurrent displacement step or during the adsorption step. The desorption effluent stream 32 is passed to a methyl chloride liquefaction zone 60 wherein the combined desorption effluent stream, or tail gas is compressed to a pressure of about 1.2 MPa or greater to liquify the methyl chloride, cooled to a temperature of about 35° C. or below and flashed to remove non-condensibles such as nitrogen or methane to provide a vapor stream 34 comprising the non-condensibles and a high purity liquid methyl chloride stream 35. At least a portion of the high purity methyl chloride stream 35 is returned to the direct synthesis reaction zone 40. Preferably the purity of the methyl chloride stream in stream 35 will be greater than 97 wt-% methyl chloride and more preferably the purity of the methyl chloride stream will be greater than 99 wt-% methyl chloride. At least a portion of the vapor stream is returned to the pressure swing adsorption zone 50 as a portion of the displacement gas for the copurge of the adsorbent as indicated by line 27, or alternatively at least a portion of the vapor stream 34 may be admixed with the feed 25' to the pressure swing adsorption zone 50 and passed to the pressure swing adsorption zone 50 in line 25. The vapor stream may also be passed to an incinerator (not shown) for disposal.

In another embodiment, a methane-containing stream can be employed as a copurge stream. The methane-containing stream would be used to rinse the adsorption bed to improve the purity of the methyl chloride recovered in the tail gas stream and to improve the heating value of the unadsorbed adsorber effluent 30 for subsequent incineration. At least a portion of the methane-containing stream is withdrawn with stream 30 to increase the heating value of the adsorber effluent. Any methane adsorbed on the selective adsorbent will be desorbed with the methyl chloride and can be subsequently separated from the methyl chloride stream 35 following recompression of the methyl chloride prior to returning the methyl chloride to the reaction zone 40.

EXAMPLES

The invention will be further clarified by a consideration of the following examples which are intended to be purely exemplary of the use of the invention.

EXAMPLE I

Methyl chloride adsorption screening tests were conducted in a McBain Bakker Balance. A detailed description of this balance in general can be found in text boob such as "Physical Adsorption of Gases" by D. M. Young and A. D. Crowell, Butterworths, 1962. The system used is completely made of glass. It consists of a manifold and 16 hangdown tubes. Each tube has a quartz spring and at the end of each spring, there was a quartz bucket for holding the adsorbents. The weight gain due to adsorption was manifested as an extension of the length of the spring. The manifold is connected to an all glass diffusion pump, and in turn to a mechanical forepump. To prepare the adsorbent for adsorption, vacuum activation was carried out at an elevated temperature. The hangdown tube was heated in a fiberglass heating mantle. The temperature of activation was controlled and monitored. A temperature of about 150° C. was used to activate silica gel, and a temperature of about 350°–450° C. was used to activate the zeolites. The activation was considered complete after the pressure of the system was dropped to $10^{-5}$ torr. (generally, about 16 hours). After activation, the samples were cooled to room temperature, and methyl chloride gas was introduced to the system. The pressure of methyl chloride was monitored by a mercury manometer. The mercury was protected from methyl chloride by a one inch layer of silicon oil. The spring extension or the weight gain was monitored by a cathotometer. The introduction of methyl chloride gas was continued until the adsorbent had reached equilibrium and the weight gain of the adsorbent had stopped. Typically, the samples reached equilibrium within about 2–3 hours. Methyl chloride isotherms were measured at 8, 30, 80, 100, 200 and 700 torr. The silica gel data were measured at about 100, 200 and 300 torr. Methyl chloride loadings on the adsorbent samples were reported as weight percent. The adsorbents screened were (a) decationized clinoptilolite, (b) hydrochloric acid leached clinoptilolite (6N Boiling HCl), (c) Zeolite 5A molecular sieve, (d) sodium exchanged clinoptilolite and (e) silica gel.

The decationized clinoptilolite was prepared by ion exchanging the ore with an $NH_4Cl$ solution in the conventional manner followed by calcining at about 450° C. to remove the ammonium ion leaving the H in place of the cation. The acid leached clinoptilolites were natural clinoptilolite ores which had been acid washed to increase the silica to alumina ($Si/Al_2$) ratio. Boiling hydrochloric acid in a concentration of about 6N was employed in the making of the hydrochloric acid leached clinoptilolite adsorbent (b).

Figure 2:
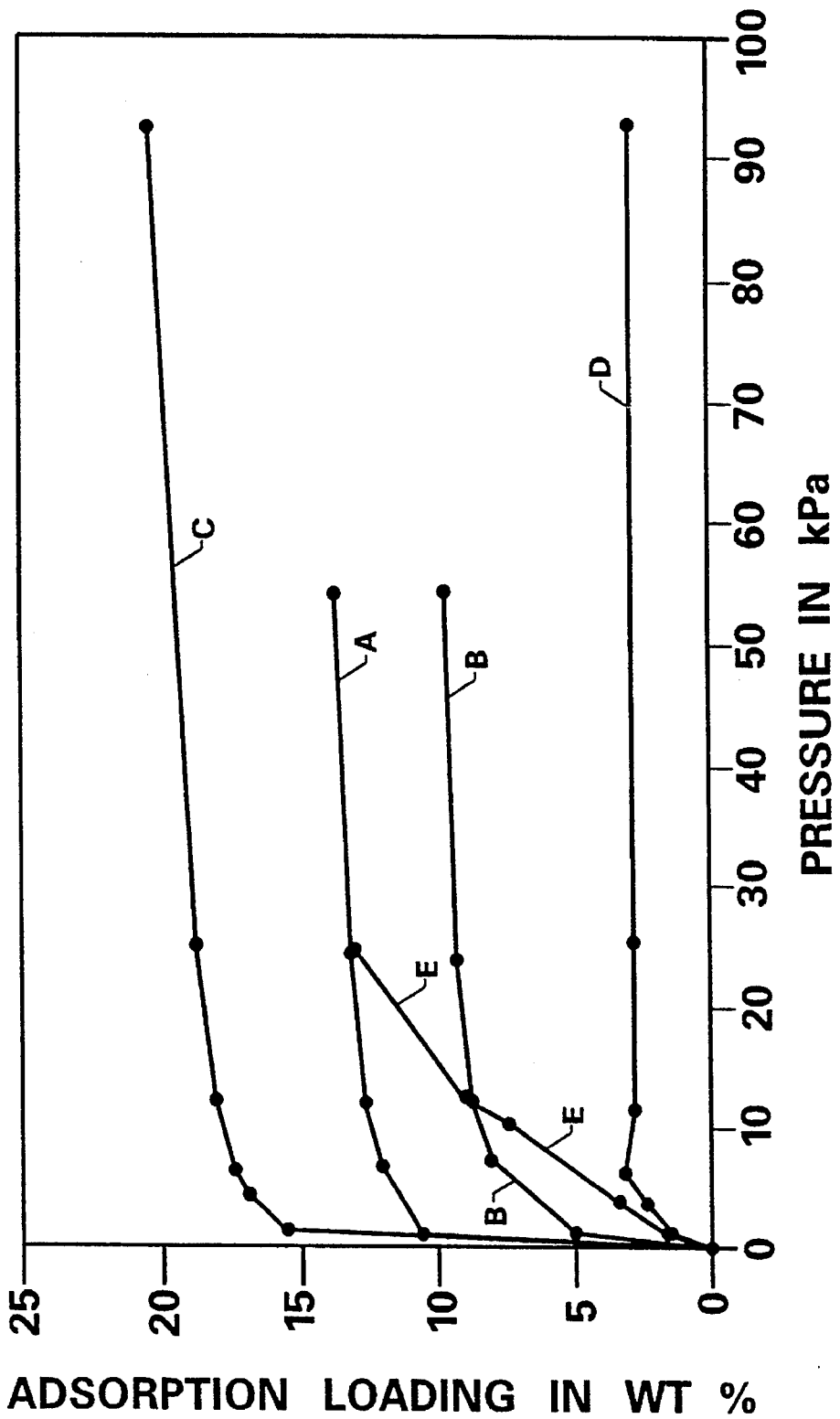
FIG. 2 illustrates equilibrium adsorption isotherms for methyl chloride for a series of adsorbents.

FIG. 2 presents the adsorption isotherms as measured in methyl chloride loadings in weight percent as a function of the methyl chloride pressure in kPa for the adsorbents having relatively strong adsorption for methyl chloride. The adsorbents exhibiting selective adsorption for methyl chloride with a reasonable loading of methyl chloride included the (a) decationized clinoptilolite, (b) the hydrochloric acid washed clinoptilolite and, (c) the Zeolite 5A molecular sieve. The sodium exchanged clinoptilolite (d) showed very low loadings for methyl chloride, while the silica gel (e) showed high methyl chloride loadings which increased significantly with increasing pressure.

EXAMPLE II

According to the procedure of Example I, a similar series of adsorption isotherms was developed for isobutane. The resulting adsorption isotherms for the hereinabove described adsorbents: (a), (b), and (c) are shown in Table 1 for pressures of about 80, 160, and 770 torr.

TABLE 1

| | ADSORPTION ISOTHERMS OF ISOBUTANE AT 22° C. PRESSURE TORR. | | |
|---|---|---|---|
| Adsorbent | 80 | 160 LOADING WT % | 770 |
| a | 0.23 | 0.23 | 0.23 |
| b | 0.03 | 0.06 | 0.24 |
| c | 0.06 | 0.13 | 0.31 | shown in Table 1, the adsorbents (a), (b), and (c) show little size selectivity for isobutane.

EXAMPLE III

With the results of the adsorption isotherms of Example I and II the selectivity of the adsorbents for methyl chloride relative to the selectivity of the adsorbents for isobutane was determined at about 200 torr and about 22° C. and shown in Table 2.

TABLE 2

| ADSORBENT SELECTIVITY FOR METHYL CHLORIDE/ ISOBUTANE | |
|---|---|
| ADSORBENT | SELECTIVITY @ 200 TORR |
| a | 108 |
| b | 106 |
| c | 129 |
| e | 1.3 |

These selectivities for the adsorption of methyl chloride over the adsorption of butane indicate that there is a high methyl chloride selectivity over butane for the zeolite adsorbents, ranging from about 30 to over 100 times more selective than for the silica gel adsorbent.

EXAMPLE IV

A pressure swing adsorption simulation for the processing of a vent gas stream comprising methyl chloride and 1% isobutane was performed for a silica gel adsorbent and Zeolite 5A molecular sieve based on the adsorption isotherms of Examples I and II. A PSA cycle with 4 adsorption beds wherein only 1 bed per cycle was undergoing adsorption and each bed underwent one adsorption step, two equalization steps, and a purge step was selected to illustrate the advantage of the process of the instant invention to selectively separate methyl chloride from isobutane. Table 3 shows the operation of the PSA cycle at an adsorption temperature of about 77° C. (170° F.) and an adsorption pressure of about 420 kPa and a desorption pressure about 41 Kpa. The size selectivity of the zeolite 5A adsorbent for methyl chloride over isobutane resulted in a 30 fold advantage in the recovery of isobutane for the Zeolite 5A adsorbent over the silica gel adsorbent.

TABLE 3

| | PSA SIMULATION | |
|---|---|---|
| ADSORBENT | ISOBUTANE RECOVERY IN WASTE STREAM, WT % | METHYLCHLORIDE IN WASTE STREAM, WT % |
| SILICA GEL | 2 | 1 |
| ZEOLITE 5A | 66 | 1 |

Other embodiments of the invention will be apparent to the skilled in the art from a consideration of this specification or practice of the invention disclosed herein. It is intended that the specification and examples be considered as exemplary only, with the true scope and spirit of the invention being indicated by the following claims.

We claim:

1. A process for the recovery of high purity methyl chloride from a vent gas stream comprising methyl chloride and isobutane, said process comprising passing said vent gas stream at adsorption conditions including an adsorption temperature and an adsorption pressure to a pressure swing adsorption zone, said pressure swing adsorption zone comprising an adsorption bed containing a size selective adsorbent selective for the adsorption of methyl chloride to provide a waste gas stream withdrawn at a pressure substantially equal to said adsorption pressure said waste gas stream comprising isobutane, and a tail gas stream enriched in methyl chloride relative to said vent gas stream withdrawn at a desorption pressure.

2. The process of claim 1 wherein said size selective adsorbent has pore openings of between about 3.7×3.7 Angstroms and about 4.9×5.7 Angstroms.

3. The process of claim 2 wherein said size selective adsorbent is selected from the group consisting of AlPO-31, AlPO-11, AlPO-14, AlPO-17, AlPO-41, EU-1, Ferrierite, Clinoptilolite, ZSM-11, ZSM-57, ZSM-23, Theta-1, Chiavennite, ALPO-18, MAPO-39, AlPO-12, ALPO-22, Chabazite, Deca-dodecasil 3R, TMA-E, Erionite, ZK-5, Levynite, Zeolite A, Zeolite Rho, and mixtures thereof.

4. The process of claim 1 wherein said size selective adsorbent is selected for the group consisting of acid leached clinoptilolite, decationized clinoptilolite, Zeolite 5A, Zeolite 4A and mixtures thereof.

5. The process claim 1 wherein said waste gas stream comprises less than 10 wt-% methyl chloride.

6. The process of claim 5 further comprising compressing said tail gas stream to liquify at least a portion of said methyl chloride to provide a high purity methyl chloride stream.

7. The process of claim 6 wherein said high purity methyl chloride stream comprises at least 97% methyl chloride.

8. The process of claim 6 wherein said vent gas stream comprises a vent gas stream from a direct synthesis methyl chlorosilane plant and said process further comprises returning at least a portion of said high purity methyl chloride stream to said direct synthesis methyl chlorosilane plant.

9. The process of claim 1 wherein said adsorption temperature ranges from about 20° C. to about 120° C. and said adsorption pressure ranges from about 100 kPa (14.7 psia) to about 1.7 MPa (250 psia).

10. The process of claim 1 wherein said desorption pressure is at or below atmospheric pressure.

11. The process of claim 10 wherein said desorption pressure ranges from about 0.7 kPa (0.1 psia) to about 100 kPa (14 psia).

12. The process of claim 1 further comprising copurging said selective adsorption bed with a pure methyl chloride stream.

13. The process of claim 12 wherein said pure methyl chloride stream comprises a portion of a methyl chloride feedstream to a direct synthesis methyl chlorosilane plant.

14. The pressure swing adsorption process of claim 1 further comprising copurging said selective adsorbent with a methane-containing stream.

15. The process of claim 14 further comprising separating methane from said tail gas stream.

16. A pressure swing adsorption process for the separation of methyl chloride from a feed mixture including methyl chloride and isobutane said process comprising:

a) passing the feed mixture to an adsorption zone comprising a first adsorption bed of at least two adsorption beds containing at least one solid adsorbent having a pore size about 5 Angstroms and selective for the adsorption of methyl chloride said first adsorption zone being at an adsorption pressure and an adsorption temperature and recovering a first product stream comprising isobutane;

b) cocurrently displacing the tint adsorption bed with a displacement gas and recovering a second product stream comprising isobutane;

c) cocurrently depressurizing the first adsorption bed to an equalization pressure to provide an equalization gas;

d) countercurrently depressurizing the first adsorption zone to a desorption pressure that is at or below atmospheric pressure and recovering a desorption effluent stream comprising high purity methyl chloride;

e) countercurrently purging the first adsorption bed with a purge gas from another adsorption bed and recovering a purge effluent stream comprising high purity methyl chloride; and f) combining the desorption effluent stream and the purge effluent stream to provide a combined methyl chloride stream, and compressing and cooling said combined product stream to provide a purified methyl chloride stream.

17. The process of claim 16 wherein said displacement gas comprises at least one of a high purity methyl chloride stream or a methane-containing stream.

18. The process of claim 16 wherein the displacement gas comprises a methane-containing stream and the process further comprises recovering at least a portion of the second product stream as a fuel stream.

19. The process of claim 18 wherein the purified methyl chloride stream comprises at least about 98% methyl chloride.

20. The process of claim 16 wherein said purge gas comprises at least a portion of said second product stream.

21. The process of claim 16 wherein said purge gas comprises at least a portion of said equalization gas.

22. A process for the recovery of methyl chloride from a vent gas of a direct synthesis of methyl chlorosilane plant comprising the following steps:

a) passing the vent gas comprising methyl chloride, non-condensibles, and isobutane to a pressure swing adsorption zone comprising a first adsorption bed of at least two adsorption beds containing at least one solid adsorbent having a pore size of about 5 Angstroms and selective for the adsorption of methyl chloride, said first adsorption zone being at an adsorption pressure and an adsorption temperature and recovering a first product stream comprising isobutane;

b) cocurrently displacing said first adsorption bed with a displacement gas and recovering a second product stream comprising isobutane;

c) cocurrently depressurizing the first adsorption bed to an equalization pressure to provide an equalization gas;

d) countercurrently depressurizing the first adsorption zone to a desorption pressure that is at or below atmospheric pressure and recovering a desorption effluent stream comprising methyl chloride;

e) countercurrently purging the first adsorption bed with a purge gas from another adsorption bed and recovering a purge effluent stream comprising high purity methyl chloride;

f) repressurizing said first adsorption zone; and g) combining said desorption effluent stream and said purge effluent stream into a methyl chloride rich stream, compressing said methyl chloride rich stream to provide a high purity methyl chloride stream and a vapor stream comprising non-condensibles, and returning at least a portion of said high purity methyl chloride stream to said direct synthesis methyl chlorosilane plant.

23. The process of claim 22 wherein said displacement gas comprises at least a portion of said vapor stream.

24. The process of claim 22 further comprising admixing at least a portion of said vapor stream with said vent gas stream prior to step (a).

* * * * *